United States Patent

Dawson

[15] 3,666,960
[45] May 30, 1972

[54] REVERSE BIAS PULSING OF JUNCTION DIODES TO REDUCE DETERIORATION

[72] Inventor: Robert William Dawson, Middletown, N.J.
[73] Assignee: Bell Telephone Laboratories Incorporated, Murray Hill, Berkeley Heights, N.J.
[22] Filed: May 22, 1970
[21] Appl. No.: 39,582

[52] U.S. Cl. ..........................307/311, 313/108 D, 307/202
[51] Int. Cl. ..........................H03k 17/00
[58] Field of Search..............307/311, 297, 319; 317/235 N; 313/108 D

[56] References Cited

UNITED STATES PATENTS

| | | | |
|---|---|---|---|
| 3,312,810 | 4/1967 | Offner | 313/108 D X |
| 3,333,135 | 7/1967 | Galginaitis | 313/108 D |
| 3,200,267 | 8/1965 | Cubert | 307/319 |
| 3,500,075 | 3/1970 | Hwang | 307/319 |

OTHER PUBLICATIONS

I.E.E.E. Transaction, " Suface Aspects of the Thermal Degradation of GaAs p–n Junction Lasers and Tunnel Diodes" by H. Kessler et al. Oct. 1966, Vol. 13, No. 10 pp. 688–691

*Primary Examiner*—Donald D. Forrer
*Assistant Examiner*—B. P. Davis
*Attorney*—R. J. Guenther and Arthur J. Torsiglieri

[57] ABSTRACT

The rate at which certain types of forward-biased p-n junction diodes deteriorate is significantly reduced by the periodic application of reverse bias pulses.

8 Claims, 10 Drawing Figures

INVENTOR
R. W. DAWSON
BY
Lyman Sherman
ATTORNEY

REVERSE BIAS PULSING OF JUNCTION DIODES TO REDUCE DETERIORATION

This application relates to arrangements for preventing the degradation that occurs in certain forms of forward-biased junction diodes, particularly those involving compound semiconductors.

BACKGROUND OF THE INVENTION

Solid state optical communication systems have been proposed which employ optical fiber transmission lines in conjunction with small, high radiance sources, such as p-n junction lasers and electroluminescent diodes, involving Group III–Group V compound semiconductors (see, "Integrated Optics: An Introduction," by S. E. Miller, published in the Sept. 1969 issue of the *Bell System Technical Journal.*) Unfortunately, a well documented, but incompletely understood problem affecting the useful life of forward-based junction devices suitable for this purpose has been the serious degradation of their operating characteristics. This degradation, which is evidenced by a reduction in radiant output over a period of several hundred hours occurs at moderate current densities. At high current densities, the degradation is so rapid as to preclude all but experimental use of many such devices. The problem, which also affects certain forms of tunnel diodes, has been treated extensively in the literature and many reasons have been advanced in an effort to explain this phenomenon. See, for example, "Surface Aspects of the Thermal Degradation of GaAs p-n Junction Lasers and Tunnel Diodes," by H. Kessler and N. N. Winogradeff, *IEEE Transactions on Electronic Devices*, Oct. 1966; "Permanent Degradation of GaAs Tunnel Diodes," by R. D. Gold and L. Weisberg, *Solid-State Electronics*, Nov. 1964; and "Degradation of GaAs Injection Devices," by S. A. Steiner and R. L. Anderson, *Solid-State Electronics*, Nov. 1968.

It is, accordingly, the broad objective of the present invention to extend the useful life of such junction diodes operating in a forward-biased mode.

SUMMARY OF THE INVENTION

The present invention, which is of particular interest in connection with the operation of small, energy-emitting, p-n junction diodes made of compounds of phosphorous and arsenic, such as GaAs, GaP, GaAsP, GaA1As, A1As, A1P and InAs, is based upon the discovery that the rate of deterioration of such diodes can be significantly reduced by momentarily and regularly increasing the magnitude of the inherent reverse electric field that normally exists across the junction of such diodes. Thus, in accordance with the present invention, reverse bias pulses are superimposed upon p-n diodes normally operating in a forward-biased mode. It has been observed that this improvement is observed using a wide range of pulse amplitudes and widths. For example, the degradation was significantly reduced by pulse amplitudes ranging from as little as 0.25 percent to 100 percent of reverse bias (avalanche) breakdown, and with duty cycles as small as one percent.

It should be noted that the instant invention is unrelated to, and is to be distinguished from, the problem of diode overheating. That is, the diodes in question are fully capable, from the heating point of view, of continuous operation. The application of reverse bias pulses, in accordance with the present invention, is solely related to the degradation problem discussed in the above-cited articles.

It should also be noted that in normal use, many forward-biased diodes are occasionally turned off. For example, the illumination produced by an injection diode has been proposed for use in a telephone receiver to indicate an incoming call. In such use, the diode will automatically be turned off when the receiver is removed from the cradle. The application of reverse bias pulses when the diode is on, in accordance with the present invention, is to be distinguished from the removal of the forward bias when the subscriber answers his phone and the diode is, thereby, turned off.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
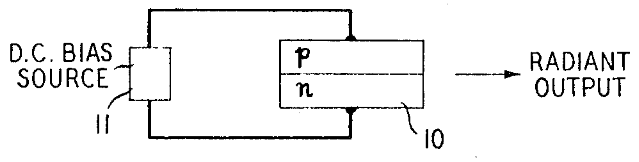
FIG. 1 (PRIOR ART)
FIG. 1 shows a prior art, forward-biased injection diode circuit.
Figure 2:
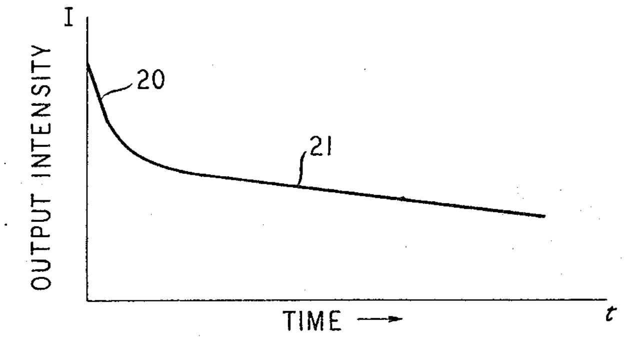
FIG. 2 illustrates the normal reduction in the intensity of the radiant output of an injection diode as a function of time.

Referring to the drawings, FIG. 1 shows a typical prior art diode circuit comprising a p-n junction diode 10 and a biasing source 11 for forward-biasing diode 10. Experience has shown that when tunnel diodes, electroluminescent diodes and injection lasers of the kind involving compound semiconductors, as described hereinabove, are operated at high current densities, of the order of 1,000 amperes per square centimeter or greater, for any extended period of time, there tends to be a degradation in their operating characteristics. By the term "-degradation," we mean a normally irreversible variation with time of one or more of the device parameters. As an example, the intensity of the output radiation from diode 10, operating in the forward-biased mode, typically decreases quite rapidly over an initial operating period, and then assumes a more gradual decrease as a function of time. This is illustrated qualitatively in FIG. 2, which shows, as a function of time, the reduction in the intensity of the radiant output of a gallium arsenide injection diode operating at a current density of 15,000 amperes per centimeter. The curve includes a first portion 20 having a relatively large slope and a second portion 21 of smaller slope. As indicated above, the loss in output intensity is usually irreversible. Thus turning the diode off after a period of operation does not regenerate the diode so as to restore it to its original input level.

Various explanations of the above-observed effect have been proposed. For example, it has been suggested that electrically active ions, perhaps interstitial zinc or copper, which are known to diffuse in GaAs under small applied fields, drift into the junction region as a result of the diminished fields when the diode is forward biased. It is further believed that this concentration of ions produces changes in the junction profile, the injection efficiency and the radiative recombination efficiency of the diode. It has also been suggested that electrically inactive substitutional ions, again perhaps zinc or copper, may be excited to interstitial sites by injections electrons when forward biased, with the same end result.

Figure 3:
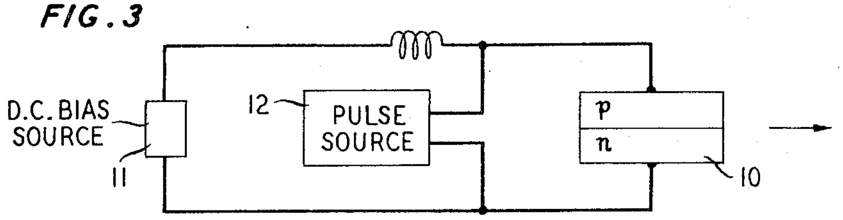
FIG. 3 shows the diode circuit of FIG. 1 modified in accordance with the present invention.

The present invention is based upon the discovery that by momentarily and regularly increasing the reverse field across a p-n diode, the above-described degradation can be substantially retarded. As is knonw, an internal electric field normally exists across the junction of every p-n junction diode as a consequence of the difference in the work functions of the two dissimilar doping materials forming the junction. This field exists in the absence of any externally applied biases. Its magnitude is reduced when the junction is forward biased, and is increased when the junction is reverse biased. Since the minimum or threshold value of reverse field that must be regularly reestablished across the junction to prevent the observed degradation depends upon the materials of which the diode is made, it can be determined empirically. Experience has shown, however, that reverse biasing the diode by as little as 0.25 percent of the avalanche breakdown bias is more than sufficient. Accordingly, in the preferred embodiment of the invention illustrated in FIG. 3, forward-biased injection diode 10 is operatedwwith reverse bias pulses superimposed upon the forward d.c. bias. Thus, as in FIG. 1, diode 10 is forward biased by means of d.c. bias source 11. In addition, a pulse generator 12 is connected across diode 10. The pulses from generator 12 are of a magnitude and polarity to reverse the external bias applied across the junction of diode 10 at regular intervals. The generator serves only this function.

Figure 4:
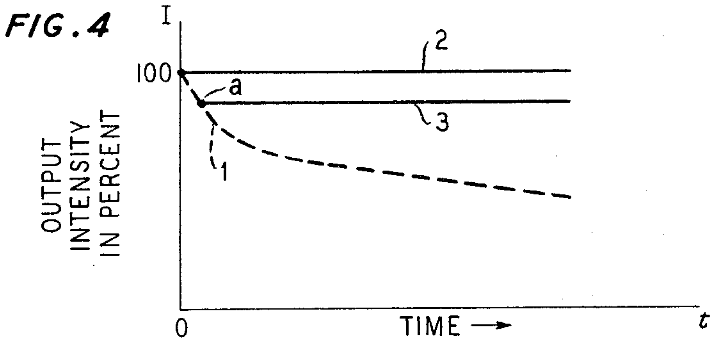
FIG. 4 illustrates the effect produced on the output characteristic of a p-n junction diode by the application of reverse bias pulses.

If applied while the diode is still capable of producing its maximum output, reverse biasing will maintain the diode output at or near its maximum value for periods of time much longer than normal. If applied after the onset of degradation, reverse biasing will not significantly regenerate the diode; however, it will tend to prevent any further decrease in output intensity. This is illustrated in FIG. 4, which shows the typical diode degradation curve 1 that can be expected if no reverse bias pulsing is employed. If, however, pulsing is applied initially, while the diode is capable of 100 percent output, this level of output will be maintained, as indicated by curve 2. If, on the other hand, pulsing is delayed until the level of output has decreased to a point *a* on curve 1, this lower level of output will be sustained thereafter, as indicated by curve 3.

It has also been observed that the pulse width and repetition rate can be varied over relatively large ranges without adversely affecting the diode. For example, satisfactory results were obtained with pulse widths of from $20\times10^{-6}$ to $500\times10^{-6}$ seconds, and pulse repetition rates of from 1,000 to 100 cycles per second. Accordingly, the parameters of the pulsing are normally chosen to have little disturbance on the intended role of the device.

Figure 5:
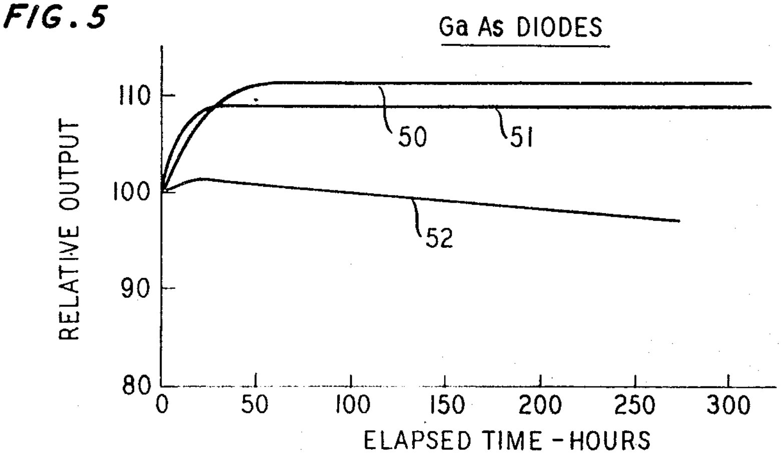
FIGS. 5, 6, 7, 8 and 9 show experimentally determined output characteristics of a number of diodes for various operating conditions.

FIG. 5 shows actual data obtained with three different gallium arsenide electroluminescent diodes produced in the following manner. A slice of Si-doped GaAs, with a carrier concentration of 2–3 × $10^{18}/cm^2$ and oriented in the [111] direction, was polished on the Ga face. This polished surface first was coated with a $SiO_2$ layer, about 1,200–1,500A. thick by the pyrolytic decomposition of ethyl-orthosilicate at 700° C. The coated sample was encapsulated with a few milligrams of $Zn_3As_2$ in a sealed, evacuated quartz ampule, and a junction 2–4 $\mu$m below the oxide-coated surface was diffused at 850° C.

The first oxide layer was removed, and a second layer about 2,000A. thick was deposited. The sample then was re-encapsulated, without dopant, and annealed at 1,000° C. for various periods ranging from ¼ to 4 hours. Following this annealing step, the second $SiO_2$ coating was removed and a third $SiO_2$ layer about 5,000–6,000A. thick was deposited. Windows about 0.5 mil in diameter on 20 mil centers were defined in this oxide by the usual photoresist methods.

The sample was encapsulated for a third time, again with $Zn_3As_2$, and diffused 1 hour at 550° to produce a low-resistivity surface layer within the windows to aid in forming contacts to the small areas of the diffused p-layer.

Electrical contact to the 0.5-mil diameter areas to be used as light-emitting junctions, and mechanical contact to the $SiO_2$ layer for mounting the diode on a metallic support, was provided by an evaporated Ti-Ag contact, followed by an electroplating of nickel and gold and an alloying period at 550° C. The back of the wafer then was lapped to produce a wafer about 2 mils thick, and an alloyed Sn-Ni-Au contact was applied to the lapped surface. Finally, the wafer was scribed so that it could be broken into 20 × 20 mil dice, each with a single junction at its center.

A single die was tin-bonded, junction side down, to a 50-mil diameter silver stud. A "well" was etched into the n-doped side of the junction by means of a concentrated, bromine-methanol mixture using an asphalt-based etch resist for masking. After the well was etched, leaving a layer of n-type GaAs about 10 $\mu$m thick at the bottom above the junction, an indium-plated copper tab was bonded to the remaining ring of the alloyed back contact to provide a d.c. lead.

Finally, the end of an optical fiber was positioned in the well above the luminescent junction and secured in place with an epoxy resin. In this operation, the fiber was held in a micromanipulator, the junction was operated at a low level of luminescnece, and the light output from the further end of the fiber was monitored with a silicon photodetector. When the output of this detector indicated that the fiber was positioned for maximum light transfer, the epoxy was applied and allowed to harden. Assembly of the unit was then complete.

Each of the above-described diodes was operated at a forward bias of 300 ma., which corresponds to a current density of 15,000 amperes per centimeter square. The reverse bias pulses had a width of 0.1 millisecond and a pulse-to-pulse spacing of 10.0 millisecond, for a one percent duty cycle.

The amplitude of the reverse bias pulses applied to the first of the diodes was such as to produce 2.5 volts of back bias, and essentially no reverse current. Reverse breakdown voltage, as indicated by 10 $\mu$a of reverse current, was 9 volts. The relative output-vs-elapsed time curve 50 for this diode shows an initial rise of about 10 percent in its relative output in the first 50 hours of operation, followed by a flattening out of the output curve, which extends over the next 250 hours.

Pulses applied to the second diode produced reverse bias of about 7 volts, drawing approximately 1 microampere of reverse current. The output-time curve 51 for this diode shows a rise of about 9 percent in output during the first 25 hours of operation, followed by an essentially constant output for the next 275 hours of the test. Reverse breakdown voltage for this diode was 8.2 volts.

Pulses applied to the third diode having an 8.2 voltage reverse breakdown voltage, produced a reverse bias of 9.5 volts, and a reverse current of about 10 milliamperes. As indicated by curve 52, the relative output rose about 1 percent initially but, thereafter, the output tended to fall of with time. It would appear from curve 52 that the reverse bias produced by the pulses should not be so large as to draw any significant reverse current.

Figure 6:
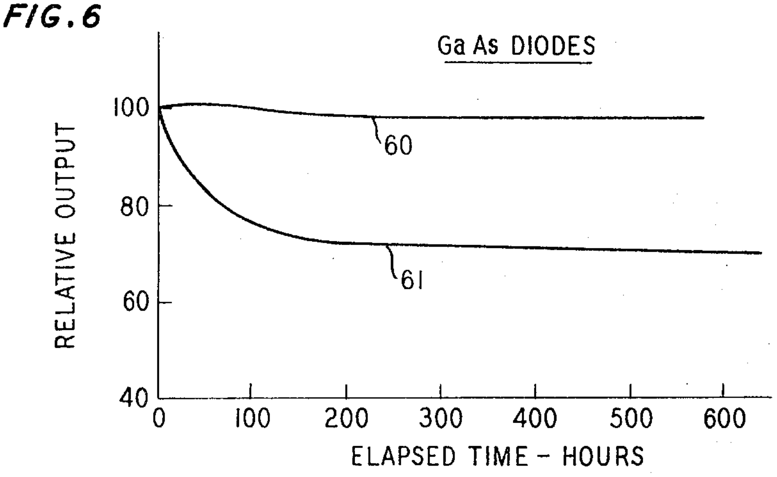

FIG. 6 shows a set of curves for another pair of diodes of the same type, one of which was reverse biased 8 volts by pulses having a 10 percent duty cycle. Reverse breakdown voltage was 8.2 volts. Curve 60 shows a relatively uniform light output for over 600 hours of pulsed operation. Curve 61 shows the degradation that resulted over the same 600-hour period when the other diode was operated without reverse bias pulses. As can be seen, the light output has decreased to about 70 percent of maximum, and is continuing to decrease slowly.

Figure 7:
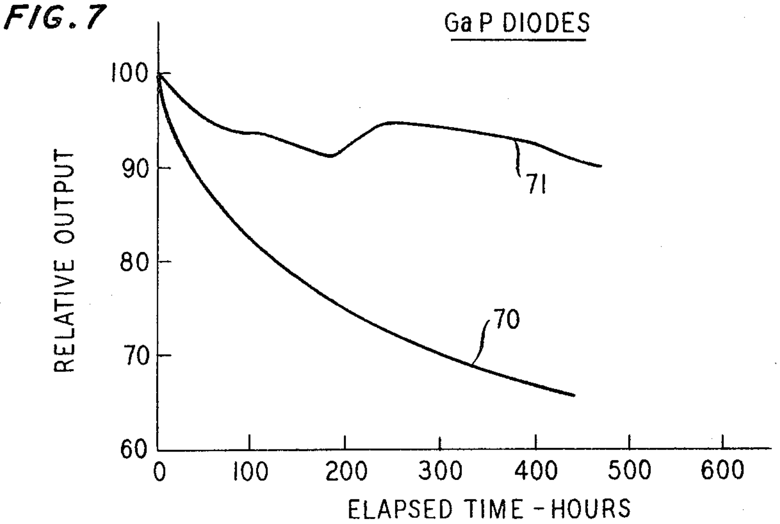

FIG. 7 shows a similar set of curves for a pair of GaP junction diodes, forward biased at the knee of their radiant output-vs-power input curve. Curve 71 shows the relative radiant output of one of the diodes operating with 10 percent duty cycle, and 10-volt reverse bias pulses. Breakdown was 13.2 volts. As can be seen, operating well beyond its rated output, the diode output has decreased by only 1 percent over a 450-hour period. By contrast, the output from the other diode, operating without reverse bias pulsing, has deteriorated to about 65 percent of its initial output, as shown by curve 70.

Figure 8:
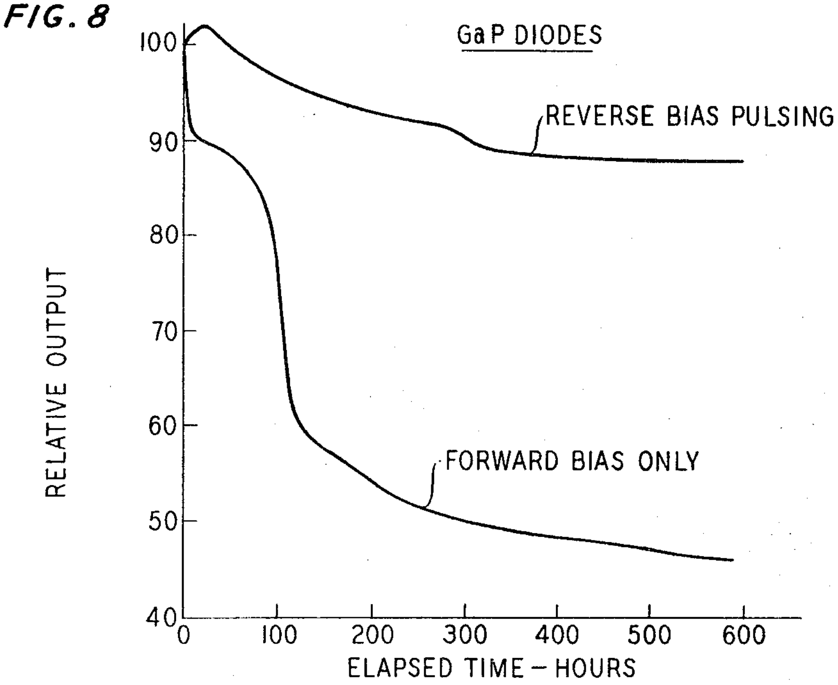
Figure 9:
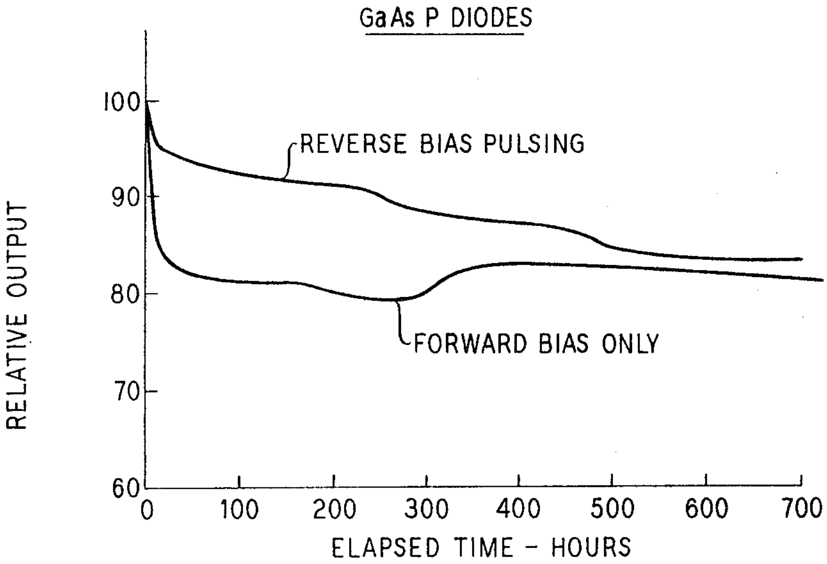

FIG. 8 shows a similar pair of curves for two General Electric Company GaP diodes (SSL–22), while FIG. 9 shows curves for two Monsanto Company GaAsP diodes (MV50). As can be seen from both sets of curves, reverse bias pulsing significantly retards diode deterioration.

Figure 10:
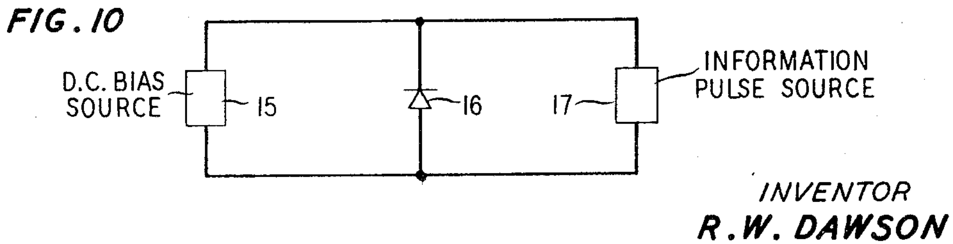
FIG. 10 shows a second embodiment of the invention.

For purposes of explanation and discussion, the d.c. bias source was described as a forward bias source and the pulse source was characterized as a reverse bias pulse source. As one example, pulses having a small (10 percent) off period are simultaneously superimposed upon a forward biased diode. It will be recognized, however, that the exact same net result can be obtained by reverse biasing the diode and simultaneously superimposing forward biasing pulses having a large (90 percent) on period. In addition, the diodes can be used in either of two different ways. In a first use, the diode, such as a luminescent diode, is used as a source of illumination. As such, the pulses are applied solely for the purpose of preventing diode deterioration. For example, in a television display, the pulses can be applied during the fly-back period. In a second use, the diode is used for signaling, such as in a pulse code modulation (PCM) system. In this latter use, the combination of d.c. bias and pulses, in addition to being applied in a manner to prevent diode deterioration, also convey information. Accordingly, for PCM operation in accordance with the present invention, the d.c. bias source 15 in FIG. 10 is adjusted to reverse bias diode 16, while pulses derived from pulse source 17 have a polarity and amplitude to forward bias the diode and, thereby, to produce the desired radiant output.

As indicated hereinabove, diode deterioration is minimized by momentarily and regularly increasing the inherent reverse junction bias above some minimum threshold. The simplest way to do this, as described herein, is merely to reverse bias the diode. However, there is some experimental evidence to suggest that it is not necessary to actually reverse the applied bias to realize the above-described improvement but that it is sufficient merely to reduce the forward bias to some low value below the knee of the diode current-vs-voltage characteristic. To do this, however, requires considerably more care to insure that the forward bias is sufficiently small so that the reverse bias threshold level has indeed been exceeded. As such, operation in this manner introduces an unnecessary complication in the bias circuit. Advantageously, the bias applied to the diode is actually reversed, thus providing a substantial margin of safety and, thereby, easing the tolerances on the circuit parameters.

In view of the above, it is understood that the above-described arrangements are illustrative of but some of the many possible specific embodiments which can represent applications of the principles of the invention. Numerous and varied other arrangements can readily be devised in accordance with these principles by those skilled in the art without departing from the spirit and scope of the invention.

While it has been shown by applicant that periodic reverse biasing tends to significantly reduce diode deterioration, it has also been more recently shown by C. A. Burrus, that this degradation can actually be reversed in some cases by the application of small amounts of thermal energy. That is, deteriorated diodes can be regenerated by means of a curing process.

I claim:

1. A method of operating a p-n junction diode of the kind which normally is subject to degradation with use, so as to minimize the rate at which said diode degrades when operated in a forward-biased state, comprising the steps of:

forward biasing said diode to the desired operating point;

and simultaneously applying regularly spaced reverse biasing pulses to said diode.

2. A method of operating a luminescent p-n junction diode, of the kind which normally is subject to degradation with use, so as to minimize the rate at which said diode degrades when operated in a forward-biased state, comprising the steps of:

forward biasing said diode to the desired operating point;

and simultaneously applying reverse biasing pulses to said diode.

3. The method of operation according to claim 2 wherein said pulses are regularly spaced.

4. The method of operation according to claim 2 wherein said pulses convey information.

5. The method of operating a p-n junction diode so as to minimize the rate of deterioration, comprising the steps of:

reverse biasing said diode;

and simultaneously applying regularly spaced forward biasing pulses.

6. The method of operating a luminescent p-n junction diode so as to minimize the rate of deterioration, comprising the steps of:

reverse biasing said diode;

and simultaneously applying forward biasing pulses.

7. The method of operation according to claim 6 wherein said pulses are regularly spaced.

8. The method of operation according to claim 6 wherein said pulses convey information.

* * * * *